US008065032B2

(12) United States Patent
Stifter

(10) Patent No.: US 8,065,032 B2
(45) Date of Patent: Nov. 22, 2011

(54) METHOD FOR DEPOSITING INDIVIDUALLY PACKAGED ITEMS IN CONTAINERS

(75) Inventor: Christian Stifter, Flurlingen (CH)

(73) Assignee: Robert Bosch GmbH, Stuttgart (DE)

( * ) Notice: Subject to any disclaimer, the term of this patent is extended or adjusted under 35 U.S.C. 154(b) by 638 days.

(21) Appl. No.: 12/162,151

(22) PCT Filed: Dec. 4, 2006

(86) PCT No.: PCT/EP2006/069247
§ 371 (c)(1),
(2), (4) Date: Jul. 25, 2008

(87) PCT Pub. No.: WO2007/085318
PCT Pub. Date: Aug. 2, 2007

(65) Prior Publication Data
US 2009/0012644 A1   Jan. 8, 2009

(30) Foreign Application Priority Data
Jan. 27, 2006   (DE) .................. 10 2006 003 859

(51) Int. Cl.
*G06F 7/00* (2006.01)
*G09G 5/00* (2006.01)
*B65G 1/00* (2006.01)
*B65G 65/00* (2006.01)

(52) U.S. Cl. ........ 700/216; 700/217; 700/214; 700/215; 345/619; 345/440; 414/286; 414/788.1; 414/751.1

(58) Field of Classification Search .......... None
See application file for complete search history.

(56) References Cited

U.S. PATENT DOCUMENTS

| 4,641,271 | A | | 2/1987 | Konishi et al. |
| RE33,416 | E | | 10/1990 | Konishi et al. |
| 5,844,806 | A | * | 12/1998 | Shibano ........................ 700/217 |
| 6,055,462 | A | | 4/2000 | Sato |
| 7,061,508 | B1 | * | 6/2006 | Noguchi et al. ............... 345/619 |
| 7,563,067 | B2 | * | 7/2009 | Neutel ........................ 414/751.1 |

FOREIGN PATENT DOCUMENTS

EP    0 590 154 A1    4/1994

OTHER PUBLICATIONS

Pedro U. Lima et al., "Learning Optimal Robotic Tasks", IEEE Expert, IEEE Service Center, New York, vol. 11, No. 2, Apr. 1, 1996, pp. 38-45, XP000585060, ISSN: 0885-9000.

* cited by examiner

*Primary Examiner* — Gene Crawford
*Assistant Examiner* — Yolanda Cumbess
(74) *Attorney, Agent, or Firm* — Ronald E. Greigg

(57) ABSTRACT

A method for depositing real items into real containers, wherein the real items are transported along a picking line and are deposited into spaces in the real containers using robots. Placement of the items is predetermined by a controller. The controller provides for the real items and the real containers to be previously associated with one another by virtue of graphical symbols for items being placed into at least one graphical symbol for a container on a screen that is connected to the controller. The method according to the invention thus makes it possible to easily and quickly fill a container with an assortment of items in the desired manner using real robot movements.

18 Claims, 4 Drawing Sheets

METHOD FOR DEPOSITING INDIVIDUALLY PACKAGED ITEMS IN CONTAINERS

CROSS-REFERENCE TO RELATED APPLICATION

This application is a 35 USC 371 application of PCT/EP 2006/069247 filed on Dec. 4, 2006.

BACKGROUND OF THE INVENTION

1. Field of the Invention

The invention relates to a method for depositing individually packaged items in containers and to a controller for performing the method.

2. Description of the Prior Art

It is known to use robot lines for depositing individually packaged items in containers. The individually packaged items and the containers are conveyed into work zones of individual robots, and the individually packaged items are deposited by robots in predefined empty spaces of the container in accordance with a controller. Picking lines are described for instance in International Patent Disclosure WO 2004/113030, U.S. Pat. Nos. 6,122,895 and 5,040,046, German Patent Disclosure DE 37 04 423, and Swiss Patent Disclosure CH 693 710. International Patent Disclosure WO 2004/018332 describes how products can be automatically recognized and selected. International Patent Disclosure WO 03/103903 and U.S. Pat. No. 4,503,507 disclose a common controller for a plurality of robots.

Enabling the robot to know which individually packaged items it is supposed to deposit and in which empty space requires complex learning processes. These learning processes must typically be performed by personnel who are especially trained for the system. If the type of packaging is to be changed, then the system has to be stopped and reprogrammed.

SUMMARY AND ADVANTAGES OF THE INVENTION

It is therefore an object of the invention to create a method and a controller which allow simple reconfiguration of the packaging operation.

In a method according to the invention, real individually packaged items are transported along a picking line and by means of robots are deposited in places, predetermined in accordance with a controller, in the real containers, and beforehand, an association is made between the real individually packaged items and the real containers, in that on a screen connected to the controller, graphically shown symbols for individually packaged items are placed in at least one graphically shown symbol for a container.

As a result, the user of the packaging line can select the desired packaging without major programming effort and expense. All that is required is that the controller of the robots make a list or library available of symbols for individually packaged items and containers that correspond to the real individually packaged items and containers, so that the robots deposit the real individually packaged items in the real containers in the way that has been predefined on the basis of the filled package assembled on the screen or on the graphical user interface.

In a preferred embodiment, the symbols on the screen are shifted by way of a drag-and-drop motion. Other possibilities, however, are also possible, for instance by way of keyboard commands.

The method and the controller according to the invention are distinguished by great flexibility. Various combinations of containers and individually packaged items can be put together very quickly and simply, and this can be done even by operators with relatively little knowledge of the system.

BRIEF DESCRIPTION OF THE DRAWINGS

Further advantageous variants and embodiments will become apparent from the description of the preferred embodiment taken in conjunction with the drawings, in which.

DESCRIPTION OF THE PREFERRED EMBODIMENT

Figure 1:
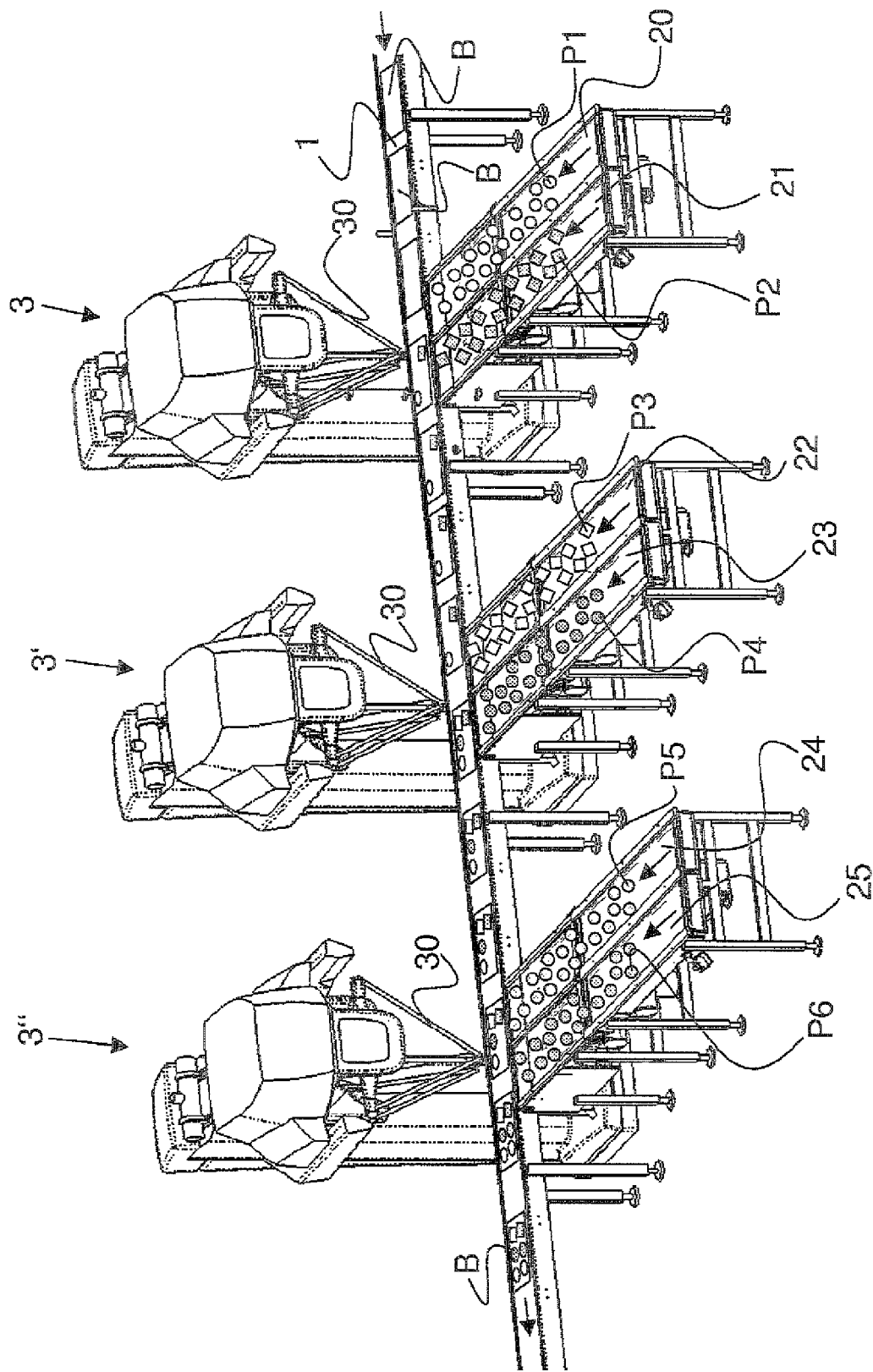
FIG. 1 shows a perspective view of a picking line of a known kind.

In FIG. 1, a picking line of a known kind is shown. A container conveyor 1 extends in a longitudinal direction and transports real containers B to a plurality of robots 3, 3', 3". The conveying direction is marked by two arrows.

Perpendicularly to the container conveyor 1, real individually packaged items P1 through P6 are delivered oil product conveyors 20-25. Per robot 3, 3', 3", there are two product conveyors 20-25 extending parallel to one another, each of which transports one type of individually packaged item P1 through P6 into the working zone of a robot 3, 3', 3".

The container and product conveyors 1, 20-25 shown here are endlessly revolving conveyor belts. However, still other transport systems are also suitable. A different number of container and product conveyors can also be used. Nor need they be disposed perpendicular to one another; instead, they can for instance extend parallel to one another, in a co-current or countercurrent flow.

Moreover, each product conveyor may deliver its own type of product. However, it is also possible either for a plurality of product conveyors to transport the same type of individually packaged item, or for different types of individually packaged items to be disposed simultaneously on one conveyor. The individually packaged items and the conveyors can furthermore be furnished to the robots in ordered or random formation. Particularly if they are conveyed in random formation, the picking line has one or more detection units of a known kind, in order to detect the location and/or type of the individually packaged items or containers.

The robots 3, 3', 3" shown here are Delta robots of a known kind that are provided with picker arms 30. Such Delta robots are described for instance in U.S. Pat. No. 4,976,582. However, other robots can also be used. The robots are connected to one another via a common controller.

Figure 2:
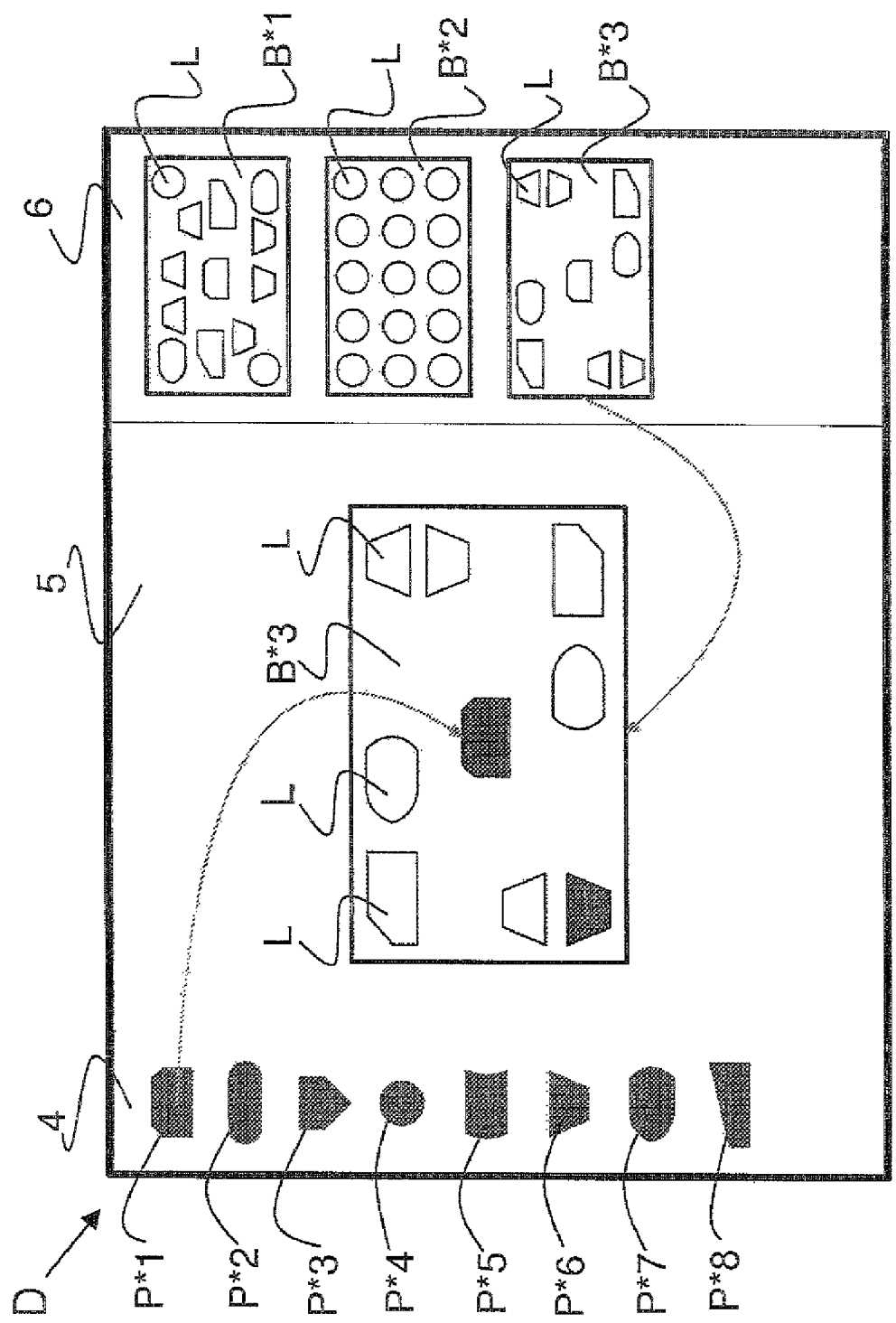
FIG. 2 shows an example of a screen view according to the invention.
Figure 3B:
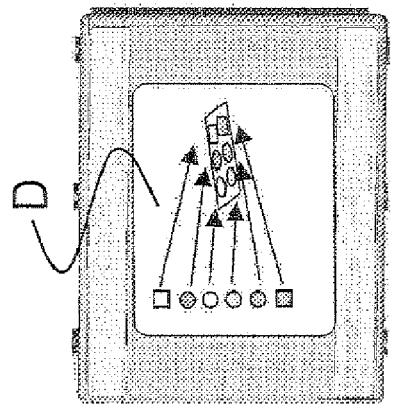
FIGS. 3a through 3d show further screen views according to the invention.
Figure 3D:
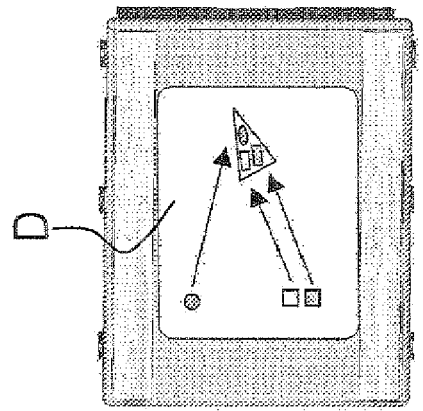
Figure 3A:
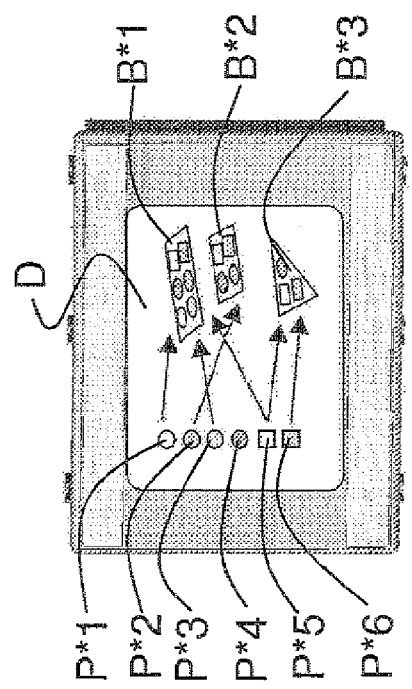
Figure 3C:
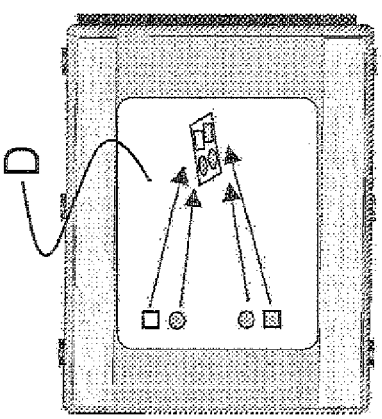

According to the invention, the robots now deposit the individual individually packaged items in the containers in accordance with a pattern that has been selected beforehand from a graphical user interface D. FIG. 2 shows this selection or configuration of the packaging operation. This configuration can be done with the system stopped. However, it can also be done while the system is in operation.

In FIG. 2, a screen is shown, which is divided into three zones. The left peripheral zone 4 contains an assortment or a list of symbols P*1 through P*8 for the individually packaged items, and each of the symbols correspond to real individually packaged items. Each symbol corresponds to one individually packaged item type. Thus eight different types are shown here. The right peripheral region 6 contains a list of symbols B*1 through B*3 for different containers, in this case three in number. These symbols likewise each correspond to real containers. The symbols of the corresponding places or empty spaces of the container symbols are identified by the letter L.

These symbols for the individually packaged items and containers originate in libraries in the computer program of the robot controller. The libraries are typically filled customer-specifically when the system is installed. They can also be supplemented, updated or changed with new products and containers at any time, as long as the controller is capable of recognizing these new containers and products and can adapt the robot motions accordingly. Either the entire library or a customer-specific selection of the symbols can be shown on the screen.

The middle region 5 forms the work surface. A container symbol can be dragged from the container list to this surface, and the empty spaces L there can be filled with symbols from the list of individually packaged items. The blank areas in the container have not yet been filled, while the shaded areas are already symbolically filled with individually packaged items.

The symbols are preferably shifted using manual drag-and-drop motions, particularly using a computer mouse or a computer pad. However, it is also possible to shift the symbols in some other known way, for instance by means of keyboard commands.

In the real packaging process, real individually packaged items of different individually packaged item types are now deposited in every real container in accordance with a predetermined pattern, producing mixed real packages; this pattern is predetermined to the controller in that on the screen, the graphically shown symbols for individually packaged items are deposited in at least one graphically shown symbol for the container, until an image of the desired mixed real package is shown on the screen.

In FIGS. 3a through 3d, further examples of screen views are shown. In contrast to FIG. 2, where all the individually packaged items and containers are visible on the screen, work is done here with a plurality of levels instead. The desired individually packaged items and containers have already been selected on a different level or clicked on using a pull-down menu. The selected individually packaged items are now freely available on the screen and can be deposited in the container in the desired arrangement.

Figure 4:
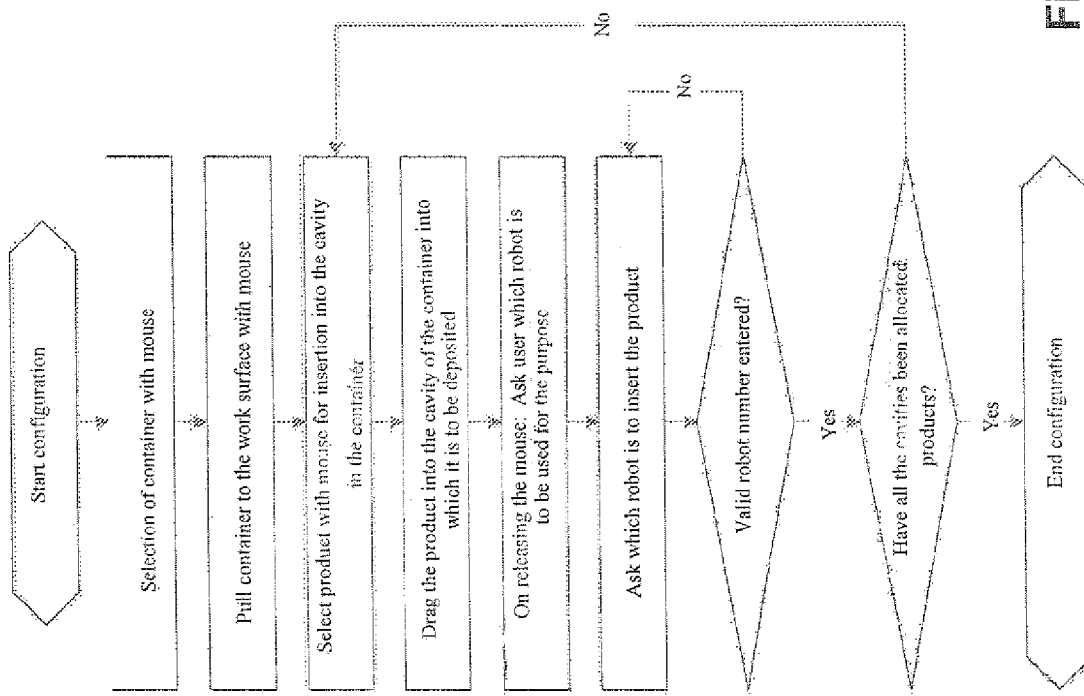
FIG. 4 is a flow chart illustrating the method of the invention.

In FIG. 4, the method of the invention is illustrated by a flow chart. The configuration starts with the selection of a container symbol, preferably with a mouse motion, and the container symbol is dragged onto the work surface of the screen. Then, with the computer mouse or some other suitable tool, the individually packaged item symbols, here called products, are selected. They are dragged individually or in groups into the cavities or empty spaces in the selected container symbol and deposited there. Preferably, the user is now asked which robot is to be used in reality for this work. If a valid robot number, or in other words a feasible embodiment, is entered, then the configuration procedure continues. If an unsuitable or nonexistent robot is selected, then the question is asked again. As soon as all the cavities have been allocated a product symbol, the configuration is ended, and the controller or its associated computer program calculates the robot motions.

It is also possible for a robot not to have to be selected manually, but instead for the computer program or the controller itself to select the most-optimal robot. It is also possible that the container symbol need not be completely filled in order to conclude the configuration.

The method of the invention thus makes it simple and fast to attain a desired filling of a container with an assortment of individually packaged items using real robot motions.

The term individually packaged item used throughout herein will be understood to include piece goods, unit loads, and wrapped or unwrapped items. Furthermore the individually packed item may include a plurality of items contained therein.

The foregoing relates to the preferred exemplary embodiment of the invention, it being understood that other variants and embodiments thereof are possible within the spirit and scope of the invention, the latter being defined by the appended claims.

LIST OF REFERENCE NUMERALS

1 Container conveyor
20 First product conveyor
21 Second product conveyor
22 Third product conveyor
23 Fourth product conveyor
24 Fifth product conveyor
25 Sixth product conveyor
3, 3', 3" Delta robot
30 Picker arm
4 List of symbols of the individually packaged items
5 Work surface
6 List of symbols of the containers
B Real container
P1 First type of real individually packaged item
P2 Second type of real individually packaged item
P3 Third type of real individually packaged item
P4 Fourth type of real individually packaged item
P5 Fifth type of real individually packaged item
P6 Sixth type of real individually packaged item
D Graphical user interface
B*1 First symbol for a container
B*2 Second symbol for a container
B*3 Third symbol for a container
L Symbol for an empty space
P*1 First symbol for a type of individually packaged item
P*2 Second symbol for a type of individually packaged item
P*3 Third symbol for a type of individually packaged item
P*4 Fourth symbol for a type of individually packaged item
P*5 Fifth symbol for a type of individually packaged item
P*6 Sixth symbol for a type of individually packaged item
P*7 Seventh symbol for a type of individually packaged item
P*8 Eighth symbol for a type of individually packaged item

The invention claimed is:

1. A method for depositing real individual items in real containers, comprising the steps of:
    transporting real individual items along a picking line;
    depositing the real individual items by means of robots in places, predetermined in accordance with a controller, in the real containers; and
    making an association beforehand between the real individual items and the real containers, by means of a screen connected to the controller, by placing graphically shown symbols on the screen for an individual item in at least one graphically shown symbol on the screen for a container;
    further comprising the step of selecting from an assortment of various symbols for individual items and/or various containers, each of the various symbols corresponding to different real individual items and real containers.

2. The method as defined by claim 1, wherein placement of the symbols on the screen is effected manually by means of a "drag-and-drop" motion.

3. The method as defined by claim 2, further comprising depositing real individual items of different types in each real container in accordance with a predetermined pattern, thereby creating mixed real packages, wherein the pattern is predetermined by the controller in that on the screen, the graphically shown symbols for individual items are placed in at least one graphically shown symbol for the container, until an image of a desired mixed real package is shown on the screen.

4. The method as defined by claim 1, wherein the real individual items are delivered separately by types of individual items.

5. The method as defined by claim 4, wherein placement of the symbols on the screen is effected manually by means of a "drag-and-drop" motion.

6. The method as defined by claim 1, wherein the real containers are completely filled.

7. The method as defined by claim 6, wherein the real individual items are delivered separately by types of individual items.

8. The method as defined by claims 1, further comprising depositing real individual items of different types in each real container in accordance with a predetermined pattern, thereby creating mixed real packages, wherein the pattern is predetermined by the controller in that on the screen, the graphically shown symbols for individual items are placed in at least one graphically shown symbol for the container, until an image of a desired mixed real package is shown on the screen.

9. The method as defined by claim 8, wherein the real containers are completely filled.

10. The method as defined by claim 8, wherein the real individual items are delivered separately by types of individual items.

11. The method as defined by claim 8, wherein placement of the symbols on the screen is effected manually by means of a "drag-and-drop" motion.

12. The method as defined by claim 1, wherein on the screen, a selection of different symbols for individual items and a selection of different symbols for containers are shown, and wherein these symbols can be selected individually or in groups and placed on a same work surface of the screen, where the symbols for the individual items are deposited in the symbol or symbols for containers.

13. The method as defined by claim 12, wherein on the screen, the symbols for the individual items, the symbols for the containers, and the work surface are shown simultaneously.

14. The method as defined by claim 1, wherein Delta robots are used as the robots.

15. A controller for performing the method as defined by claim 1, wherein the controller includes a computer program, which contains a library of first symbols for individual items and a library of second symbols for individual items, wherein the computer program converts a combination of container and products, joined together on a screen, into control commands for triggering robots, which robots deposit real individual items, corresponding to the at least one first symbol, into containers corresponding to the second symbol.

16. A computer program executed on a computer readable medium for performing the method as defined by claim 1, which contains a library of first symbols for individual items and a library of second symbols for individual items, wherein the computer program converts a combination of container and products, joined together on a screen, into control commands for triggering robots, which robots deposit real individual items, corresponding to the at least one first symbol, in a container corresponding to a second symbol.

17. A graphical user interface for performing the method as defined by claim 1, wherein on a screen, a list of different first symbols for different individual items and a list of different second symbols for containers are shown, and moreover there is a work surface on the screen, in order, on this work surface, to deposit selected first symbols for individual items in selected second symbols for containers.

18. A method for depositing real individual items in real containers, comprising the steps of:
transporting real individual items along a picking line;
depositing the real individual items by means of robots in places, predetermined in accordance with a controller, in the real containers;
making an association beforehand between the real individual items and the real containers, by means of a screen connected to the controller, by placing graphically shown symbols on the screen for an individual item in at least one graphically shown symbol on the screen for a container; and
further comprising the step of making an association beforehand between the real individual items and places or empty spaces of the containers, by placing graphically shown symbols on the screen for an individual item within at least one graphically shown symbol corresponding to places or empty spaces of a container.

* * * * *